United States Patent [19]

Walker, Jr.

[11] 4,151,376
[45] Apr. 24, 1979

[54] AMPLIFIER FOR TELEPHONE HANDSET

[75] Inventor: Wesley F. Walker, Jr., Ringgold, Ga.

[73] Assignee: Walker Equipment & Service Co., Ringgold, Ga.

[21] Appl. No.: 761,932

[22] Filed: Jan. 24, 1977

[51] Int. Cl.² ............................................. H04M 1/60
[52] U.S. Cl. ................................. 179/81 B; 179/1 A; 179/100 L
[58] Field of Search .................. 179/81 B, 1 A, 1 HF, 179/100 L

[56] References Cited

U.S. PATENT DOCUMENTS

| | | | |
|---|---|---|---|
| 2,808,461 | 10/1957 | Thomas | 179/81 B |
| 2,885,483 | 4/1959 | Faulkner | 179/81 B |
| 2,885,484 | 5/1959 | Faulkner et al. | 179/81 B |
| 3,172,960 | 3/1965 | Voyles | 179/81 B |
| 3,197,570 | 7/1965 | Lambourn | 179/81 B |
| 3,254,160 | 5/1966 | Day et al. | 179/81 B |
| 3,908,094 | 9/1975 | Deluege | 179/81 B |

Primary Examiner—Kathleen H. Claffy
Assistant Examiner—E. S. Kemeny
Attorney, Agent, or Firm—Seidel, Gonda, Goldhammer & Panitch

[57] ABSTRACT

An amplifier for a telephone handset provided with standard telephone line cord having a pair of receiver input signal lines for direct connection to the handset receiver terminals and a pair of transmitter input lines for direct connection to the handset transmitter terminals. A printed circuit board is electrically connected to and secured to the handset receiver. The receiver input signal lines are directly connected to the printed circuit board without alteration. The input signal is received independently of the receiver input signal line polarity. The transmitter input lines are connected directly to the transmitter without alteration.

9 Claims, 4 Drawing Figures

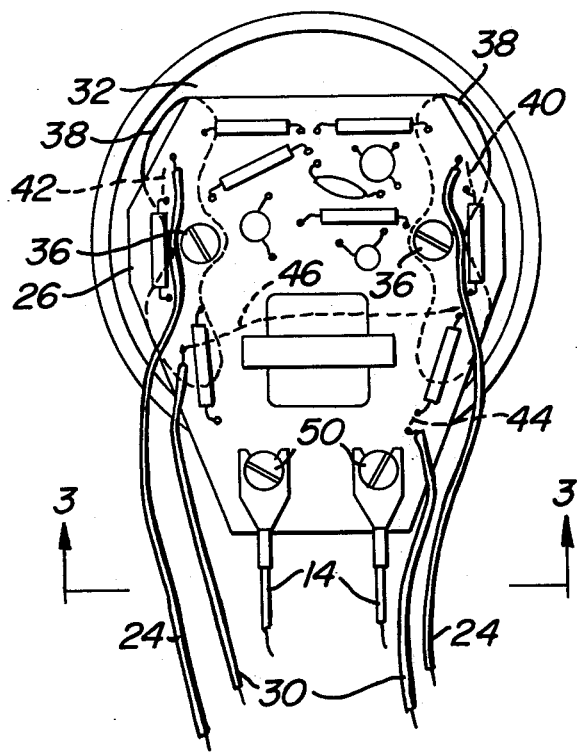
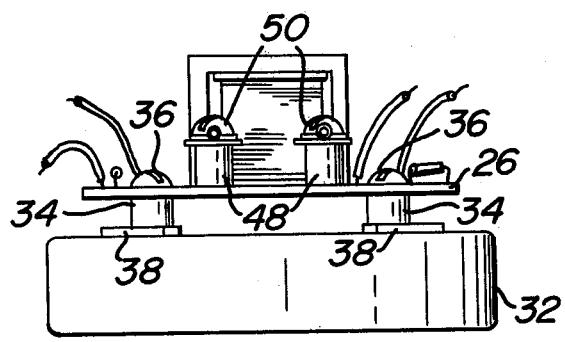
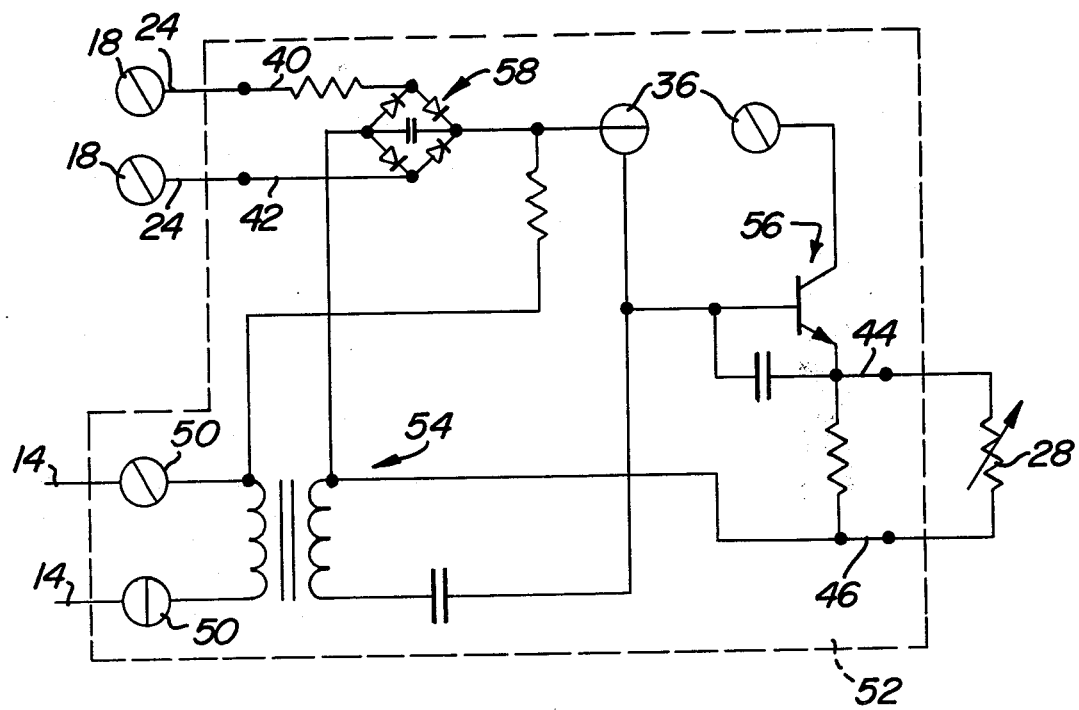

AMPLIFIER FOR TELEPHONE HANDSET

BACKGROUND OF THE INVENTION

The present invention is directed to an amplifier for telephone handset. In particular, the invention is directed to an amplifier for a telephone handset which is directly connectable to existing standard telephone line cord without altering the cord in any manner.

Amplifiers for telephone handsets are well-known. For example, see U.S. Pat. Nos. 3,254,160 and 3,830,979. Conventional amplifier handsets, however, suffer from several serious deficiencies. Typically, to install a conventional amplifier, it is necessary to alter the standard telephone line cord by severing the receiver input signal lines and connecting the same to a junction at the transmitter cup. The receiver input signal lines must be color coded at the transmitter junction to properly connect the same to the amplifier. Thus, the conventional amplifier is sensitive to the receiver input signal line polarity, and properline polarity must be observed for each of the amplifier circuit interconnections.

Installation of a conventional amplifier for a telephone handset is slow and cumbersome. Unless the receiver input signal lines are properly color coded, installation must proceed step by step according to relatively complicated wiring schematics. In either case, the input lines may be improperly connected in respect to polarity by an unskilled repairman. Moreover, to properly install the conventional amplifier, the standard telephone line cord must be altered or special line cord provided in replacement further adding to the costs of installation and repair.

To date, the need for an amplifier which can be quickly and conveniently installed in a telephone handset without regard to receiver input signal line polarity using existing standard telephone line cord has not been met.

BRIEF SUMMARY OF THE INVENTION

An amplifier for a telephone handset provided with standard telephone line cord having a pair of receiver input signal lines for direct connection to the handset receiver terminals and a pair of transmitter input lines for direct connection to the handset transmitter terminals. Means for receiving the input signal independently of the receiver input signal line polarity are directly connectable to the receiver input signal lines. Means for supplying a dc bias signal independently of the transmitter input line polarity are connectable to the transmitter terminals via a pair of supply lines. Means for amplifying the received input signal and for driving the handset receiver are operatively associated with the receiving means and supply means.

An advantage of the invention is that it can be rapidly installed in a telephone handset without color coding the standard telephone line cord and without reference to wiring schematics.

Another advantage of the invention is that it can be conveniently installed in a telephone handset using standard telephone line cord without alteration.

A further advantage of the invention is that it amplifies the received input signal independently of receiver input signal line polarity.

A still further advantage of the invention is that it is easily assembled on printed circuit boards in large numbers.

Other advantages of the invention appear hereinafter.

For the purpose of illustrating the invention, there is shown in the drawings a form which is presently preferred; it being understood, however, that this invenion is not limited to the precise arrangements and instrumentalities shown.

BRIEF DESCRIPTION OF THE DRAWINGS

FIG. 2 is a bottom view of a printed circuit board electrically connected to and secured to a handset receiver.

FIG. 3 is a view of the assembly in FIG. 2 taken along the lines 3—3.

FIG. 4 is an electrical schematic of the printed circuit board components.

DETAILED DESCRIPTION OF THE INVENTION

Figure 1:
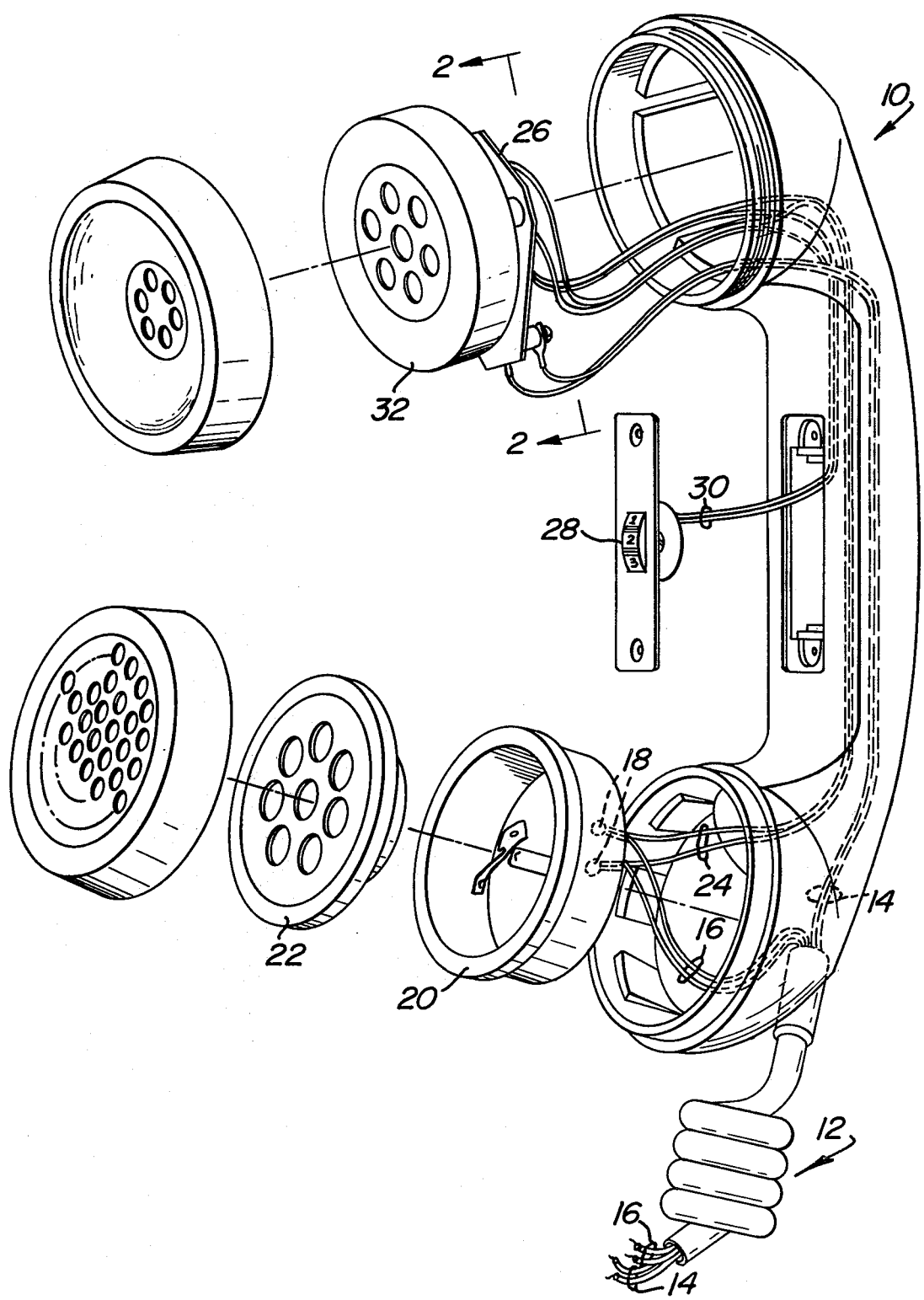
FIG. 1 is an exploded view of the amplifier of the present invention installed in a telephone handset using standard telephone line cord.

Referring to the drawings, wherein like numerals indicates like elements, there is shown in FIG. 1 a telephone handset 10 with an amplifier installed in accordance with the principles of the present invention. The handset uses standard telephone line cord 12 comprising a pair of receiver input signal lines 14 and a pair of transmitter input lines 16. Standard telephone line cord is used in conventional handsets not provided with amplification. In standard telephone line cord, the receiver input signal lines 14 are longer than the transmitter input lines 16 by approximately the length of the handset 10. As described more fully below, the standard telephone line cord 12 is connected to the amplifier without alteration. The lines 14 and 16 are neither severed nor color coded. They are connected without reference to any wiring schematics.

The transmitter input lines 16 are connected to conventional junctions 18 at the underside of a standard transmitter cup 20. Each junction 18 comprises a screw contact (not shown) which secures the end of a transmitter input line to the cup. The end of a transmitter input line is provided with a spade clip for this purpose. Junctions 18 are connected to a pair of spring contacts (not shown) which electrically contact the underside of transmitter 22 in conventional fashion. The transmitter 22 is seated in conventional manner in the cup 20. A pair of supply lines 24 is connected directly to the transmitter cup junctions 18. The supply lines 24 are soldered to a pair of leads on a printed circuit board 26.

The receiver input signal lines are fed through the handset and are connected to a pair of posts on the printed circuit board 26 by means of screws. A rotary adjustable resistance 28 is connected to the printed circuit board 26 by means of a pair of lines 30 which are soldered to appropriate leads on the printed circuit board. The amplifier is mounted on the printed circuit board and is adjusted by manual operation of the adjustable resistance 28. The amplifier drives a conventional receiver 32 which is seated in usual fashion in the handset.

The telephone line cord 12, transmitter cup 20, transmitter 22 and receiver 32 are conventional components in the standard telephone handset without amplification. The amplifier of the present invention is assembled by merely adding the supply lines 24, adjustable resistance 28 and printed circuit board 26 as described hereinafter.

The printed circuit board 26 is electrically connected to and secured to the receiver 32 by means of spacers 34 and screws 36. See FIGS. 2 and 3. Spacers 34 are metallic and contact the receiver 32 at the receiver input terminals 38 which are solid metal lands mounted on the receiver.

The printed circuit board 26 is shaped as shown in FIG. 2 so that the assembly of the printed circuit board and receiver fits snugly within the handset. Although the printed circuit board is shown as having six sides in FIG. 2, it should be understood that the board may assume other geometrical shapes so long as the board and receiver can be seated without obstruction in the handset.

The supply lines 24 are soldered to leads 40 and 42 on the printed circuit board. Supply lines 24 are provided with spade clips at their ends for connection to the transmitter junctions 18. The adjustable resistance lines 30 are also soldered to the printed circuit board at leads 44 and 46. In installing the amplifier, the adjustable resistance lines 30 are brought from the printed circuit board through the handset to the adjustable resistance 28 to which they are soldered in conventional manner.

The receiver input signal lines 14 in the standard telephone line cord are provided with spade clips at their ends. The receiver input signal lines carry the received input signal from the telephone sbuset. The receiver input signal lines are fed through the handset to the printed circuit board 26 where the lines are electrically connected to posts 48 by means of scres 50.

An electrical schematic of the amplifier circuit 52 mounted on the printed circuit board according to the principles of the present invention is shown in FIG. 4. The receiver input signal lines 14 are connected by means of screws 50 to the primary of a transformer 54. The secondary of transformer 54 drives a common emitter connected transistor circuit 56. Bias voltage for the transistor circuit 56 is provided by a full wave rectifier bridge 58 which is connected via leads 24 to transmitter junctions 18. The full wave rectifier bridge 58 provides dc bias to the transistor circuit 56 independently of the polarity of lines 24. Thus, the repairman can reverse the connection of lines 24 to transmitter junctions 18 without affecting the dc bias to the transistor circuit.

In addition, the transformer 54 renders the amplifier circuit 52 insensitive to the polarity of the receiver input signal lines 14. Accordingly, the interconnection of lines 14 can be reversed by the repairman without affecting the operation of the amplifier circuit. Lines 14, therefore, need not be color coded, severed or connected to separate junctions on the transmitter cup as in the prior art. Lines 14 are not altered in the present invention. The lines are directly connected to printed circuit board 26. The connection of lines 14 can be easily made without reference to wiring schematics or the like.

The output of the amplifier circuit 52 is provided at screws 36 which contact lands 38. This output drives the receiver 32 at varying levels determined by the setting of adjustable resistance 28. It should be understood that adjustable resistance 28 is a conventional component mounted in the telephone handset and is external to the printed circuit board 26.

An advantage of the invention is that it provides amplified receiver input signals independently of both the transmitter input line polarity and the receiver input signal line polarity. The amplifier circuit is conveniently mounted on a printed circuit board which can be rapidly connected to the receiver. The supply lines 24 can be connected to the transmitter junctions 18 without regard to polarity. The adjustable resistance lines 30 can be soldered to the conventional resistance 28 without regard to polarity. None of the receiver or transmitter elements of the conventional handset are changed in shape or position. The receiver input signal lines of the standard telephone line cord can be rapidly connected to posts 48 and screws 50 at the printed circuit board. None of the wires need be color coded. No installation schematics are required.

The present invention may be embodied in other specific forms without departing from the spirit or essential attributes thereof and, accordingly, reference sould be made to the appended claims, rather than to the foregoing specification as indicating the scope of the invention.

I claim:

1. An amplifier assembly for a telephone handset having first and second ends separated by a handle, a receiver at the first end and a transmitter at the second end and standard telephone line cord having a pair of receiver input signal lines which extend within the handset to the first end for direct connection to the handset receiver and a pair of transmitter input lines which extend within the handset at the second end for direct connection to the handset transmitter, comprising:

a printed circuit board mounted on and electrically connected to the receiver at the first end of the handset, transformer means mounted on said printed circuit board, said transformer means having a pair of primary terminals and a pair of secondary terminals, one of said primary terminals being connected to one of said receiver input signal lines and the other of said primary terminals being connected to the other of said receiver input signal lines, without alteration of the receiver input signal lines and independently of the polarities of the receiver input signal lines, a pair of supply lines connected to the transmitter input signal lines without alteration of the transmitter input signal lines, rectifier means mounted on said printed circuit board, said rectifier means having a pair of input terminals and a pair of output terminals, one of said input terminals being connected to one of said supply lines and the other of said input terminals being connected to the other of said supply lines, independently of the polarities of the supply lines, and an amplifier mounted on said printed circuit board for amplifying an input signal on the receiver input signal lines and for driving the handset receiver with the amplified signal, said amplifier being connected to said transformer means secondary terminals and to said rectifier means output terminals.

2. The amplifier assembly according to claim 1 including an adjustable resistor mounted on said handset, said amplifier having a pair of lines for connection to said adjustable resistor whereby the gain of said amplifier can be adjusted.

3. An amplifier assembly for a telephone handset having first and second ends separated by a handle, a receiver at the first end and a transmitter at the second end and standard telephone line cord having a pair of receiver input signal lines which extend within the handset to the first end for direct connection to the handset receiver and a pair of transmitter input lines which extend within the handset at the second end for direct connection to the handset transmitter, comprising:
  a printed circuit board in juxtaposition with the receiver at the first end of the handset, said printed circuit board being electrically connected to and secured to the handset receiver,
  a transformer mounted on said printed ciruit board, said transformer having a pair of primary terminals and a pair of secondary terminals, one of said primary terminals being connected to one of said receiver input signal lines and the other of said primary terminals being connected to the other of said receiver input signal lines, without alteration of the receiver input signal lines and independently of the polarities of the receiver input signal lines,
  a pair of supply lines connected to the transmitter input lines without alteration of the transmitter input lines,
  a rectifier circuit mounted on said printed circuit board, said rectifier circuit having a pair of input terminals and a pair output terminals, one of said input terminals being connected to one of said supply lines and the other of said input terminals being connected to the other of said supply lines, independently of the polarities of said supply lines,
  an amplifier mounted on said printed circuit board for amplifying an input signal on the receiver input signal lines and for driving the handset receiver with the amplified signal, said amplifier being connected to said transformer secondary terminals and to said rectifier circuit output terminals.

4. The amplifier assembly according to claim 3 including means mounted on said handset for selectively adjusting the gain of said amplifier, said amplifier having a pair of lines for connection to said adjusting means.

5. The amplifier assembly according to claim 4 wherein said adjusting means includes a variable resistance mounted on the telephone handset external to said printed circuit board.

6. An amplifier assembly for a telephone handset having first and second ends separated by a handle, a receiver at the first end and a transmitter at the second end and standard telephone line cord having a pair of receiver input signal lines which extend within the handset to the first end for direct connection to the handset receiver and a pair of transmitter input lines which extend within the handset at the second end for direct connection to the handset transmitter, comprising:
  a printed circuit board in juxtaposition with the receiver at the first end of the handset,
  means for electrically connecting and securing said printed circuit board to the receiver,
  a transformer mounted on said printed circuit board, said transformer having a pair of primary terminals and a pair of secondary terminals, one of said primary terminals being connected to one of said receiver input signal lines and the other of said primary terminals being connected to the other of said receiver input signal lines without alteration of the receiver input signal lines and independently of the polarities of said receiver input signal lines,
  a pair of supply lines connected to the handset transmitter input lines without alteration of the transmitter input lines,
  a rectifier circuit mounted on said printed circuit board, said rectifier circuit having a pair of input terminals and a pair of output terminals, one of said input terminals being connected to one of said supply lines and the other of said input terminals being connected to the other of said supply lines independently of the polarities of said supply lines, and
  an amplifier mounted on said printed circuit board for amplifying an input signal on the receiver input signal lines and for driving the handset receiver with the amplified signal, said amplifier being connected to said transformer secondary terminals and to said rectifier circuit output terminals.

7. The amplifier assembly according to claim 6 including a variable resistance mounted on the handset for selectively adjusting the gain of said amplifier.

8. In an amplifier assembly for a telephone handset including a transmitter, a receiver, a printed circuit board disposed within said handset, and standard telephone line cord having a pair of receiver input signal lines and a pair of transmitter input lines, the combination comprising:
  a transformer mounted on the printed circuit board having a pair of primary terminals and a pair of secondary terminals, one of said primary terminals being constructed and arranged for connection to one of said receiver input signal lines and the other of said primary terminals being constructed and arranged for connection to the other of said receiver input signal lines, without alteration of the receiver input signal lines and independently of the polarities of said receiver input signal lines,
  rectifier means mounted on the printed circuit board having a pair of supply lines, one of said supply lines being constructed and arranged for connection to one of the transmitter input lines and the other of said supply lines being constructed and arranged for connection to the other of said transmitter input lines, without alteration of said transmitter input lines and independently of the polarities of said transmitter input lines, and
  an amplifier mounted on the printed circuit board for driving the receiver, said amplifier being connected to said transformer secondary terminals and to said rectifier means.

9. An amplifier assembly for a telephone handset including a transmitter, a receiver, and standard telephone line cord having a pair of receiver input signal lines and a pair of transmitter input lines, comprising:
  a transformer having a pair of primary terminals and a pair of secondary terminals, one of said primary terminals being constructed and arranged for connection to one of said receiver input signal lines and the other of said primary terminals being constructed and arranged for connection to the other of said receiver input signal lines without alteration of said receiver input signal lines and independently of the polarities of said receiver input signal lines,
  rectifier means having a pair of supply lines, one of said supply lines being constructed and arranged for connection to one of the transmitter input lines and the other of said supply lines being constructed and arranged for connection to the other of said transmitter input lines, without alteration of said transmitter input lines and independently of the polarities of said transmitter input lines, and
  an amplifier for driving the receiver, said amplifier being connected to said transformer secondary terminals and to said rectifier means.

* * * * *